Oct. 15, 1940.  L. O. BURT  2,217,728
TRANSMISSION
Filed Nov. 8, 1937  2 Sheets-Sheet 1
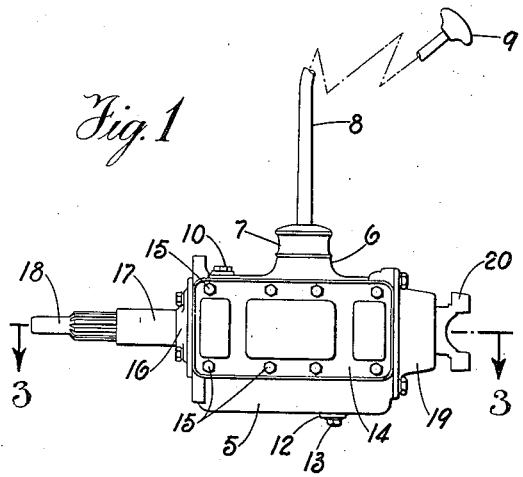
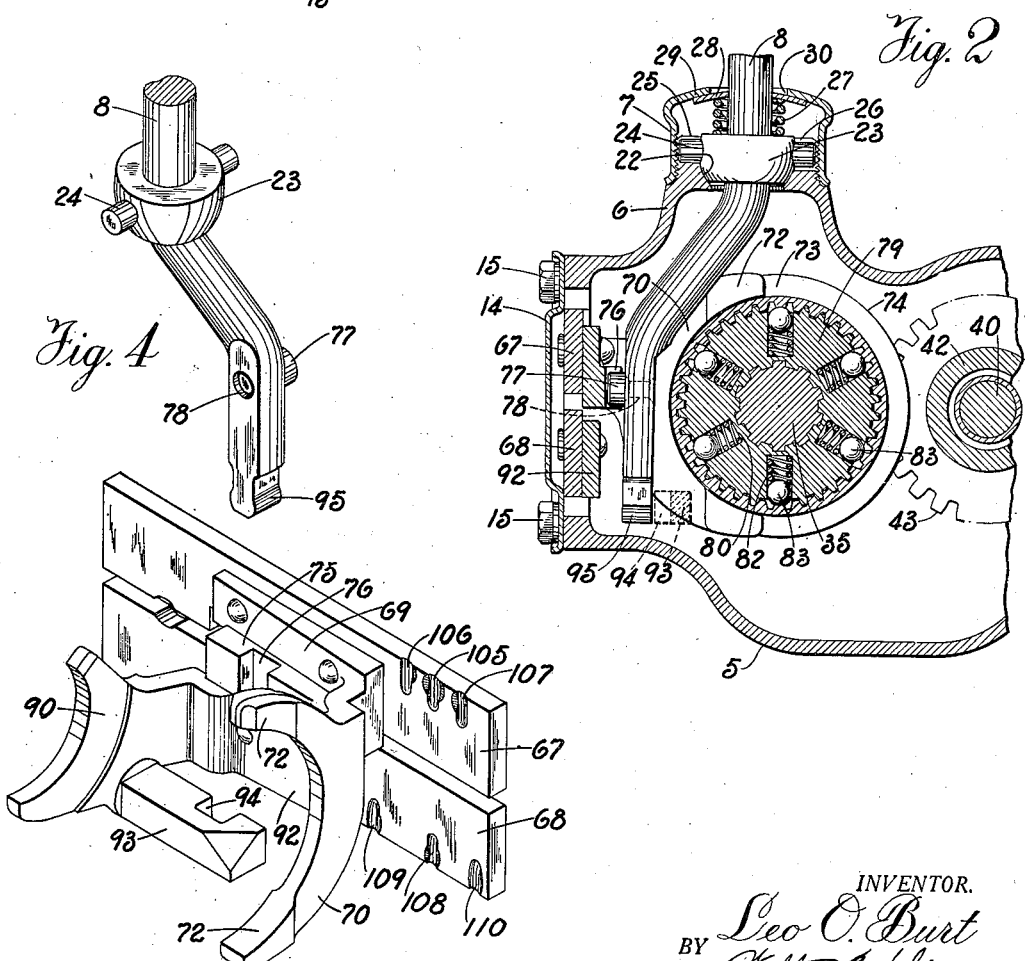
INVENTOR.
Leo O. Burt
BY Walter E. Schirmer
ATTORNEY.

Oct. 15, 1940.   L. O. BURT   2,217,728
TRANSMISSION
Filed Nov. 8, 1937   2 Sheets-Sheet 2

INVENTOR.
BY Leo. O. Burt
Walter E. Schismer
ATTORNEY.

Patented Oct. 15, 1940

2,217,728

UNITED STATES PATENT OFFICE 2,217,728

TRANSMISSION

Leo O. Burt, South Bend, Ind., assignor to The Studebaker Corporation, South Bend, Ind., a corporation of Delaware Application November 8, 1937, Serial No. 173,312

10 Claims. (Cl. 74—473)

This invention relates to transmissions, and more particularly is directed to a transmission construction for automotive vehicles wherein the countershaft is offset laterally in the transmission.

It has been customary heretofore to provide transmission assemblies of this general class in which the driven shaft was disposed adjacent the top of the transmission case and the countershaft and reverse gear shaft were disposed in the lower part of the case. In such constructions the shifter rods for effecting the desired shifting movement to effect predetermined gear selection were disposed along the top of the transmission, while the gear shift lever pedestal was superposed thereon. Such a construction is objectionable in many respects, inasmuch as the housing for the same was of appreciable vertical height and the superposed pedestal increased its vertical extent materially. With the appearance on the automotive market of low underslung frames, the necessity for maintaining proper road clearance with such transmissions required that the housing project upwardly through the floor forward of the front seat of the vehicle, distorting the level floor line and also the available leg room for the front seat passengers. This kick up in the floor was also objectionable from the standpoint of body design and assembly.

A more serious objection to such a transmission construction which has arisen in recent years is the impracticability of mounting automatic shifting mechanism thereon for actuating the shifting rods. Any such mechanism increases the vertical height of the assembly and consequently decreases the space within the car body.

Another objection to the standard type of transmissions with which I am familiar is the probability of an operator shifting from low speed into reverse by mistake, due to the straight line shifting movement with no bias acting to throw the shift lever laterally as it passes neutral position into engagement with the second speed shifting rod and out of engagement with the reverse and low speed shifting rod. This, and the inability of the operator to ascertain positively the position of the lever relative to the shift rods as he initiates shifting movement, may result in serious damage to the transmission in the hands of an inexperienced operator.

One of the main objects of the present invention is to provide a structure of this type wherein the drive shaft and countershaft are laterally spaced, and the shift rods are disposed in vertical alinement at one side of the transmission construction.

By laying the transmission on its side, I am able to reduce appreciably the vertical height thereof and consequently can maintain desired road clearances without necessitating any protrusion of the housing above the level of the front floor. Thus a flat floor surface can be provided, giving ample leg room for passengers, and providing no obstructions that might require special considerations in the design and construction of the vehicle body.

Another advantage secured by the present construction is the reduction in height for the gear shift lever supporting pedestal, and the provision of the shift rods at one side of the transmission allows the application of automatic or semi-automatic shifting mechanisms laterally thereto, thereby maintaining the minimum vertical height desired while still allowing for lateral application of accessory mechanisms.

The decrease in vertical height and the lateral spacing of the shafts provides a much shallower housing and consequently decreases to a considerable extent the quantity of oil required to be maintained in the transmission to insure adequate lubrication.

In the present construction the gear shift lever is mounted on a ball socket joint in such manner as to be normally biased laterally into engagement with the second and high speed shifter rod, and out of engagement with the low and reverse speed shifter rod. As a result, a noticeable effort is required to move the lever laterally in the opposite direction to engage the first and reverse speed shifter rod, so that an operator is immediately apprised of the fact he is in low gear, and when moving the lever forwardly it will automatically swing over to select the second and high speed shifter rod, and must be held against such lateral movement with appreciable effort in order to continue shifting movement from low speed into reverse.

It will be apparent that the vertical spacing of the shifter rods, with the gear shift lever extending vertically therepast and pivoted intermediate its ends, results in a longer effective shifting arm engaging the lower rod than the arm for shifting the upper arm. Consequently the same unit movement of the upper end of the gear shift lever will produce a greater longitudinal movement of the lower rod than of the upper rod. The transmission of the present invention is so designed as to compensate for this, and the same amount of forward and rearward movement at the upper end of the lever will produce the required shifting movement of the selected shifter rod.

Still another feature of the present invention resides in the provision of a removable side plate enclosing the lateral side of the transmission housing laterally of the shifter rods. Should the gear shift lever break at its lower end, or should any damage occur to the shifter rods or forks, it is a relatively easy matter, in the present construction, to open up the transmission housing laterally to gain access to these portions of the structure.

Another advantage of the present construction is its simplicity of design and assembly, as well as the economical and commercial advantages gained by reason of its design and construction. With the present construction it is possible to move the engine forward in the frame, since the transmission can be correspondingly moved forward, and the gear shift lever can be located in the longitudinal center of the housing and thus does not interfere with the forward slope of the foot boards or the instrument board.

Other objects and advantages of the present invention will be more apparent from the following detailed description which, taken in conjunction with the accompanying drawings, will disclose to those skilled in the art the particular construction and operation of a preferred form of the present invention.

In the drawings:

Figure 1 is an elevational view of one form of the present invention;

Figure 2 is a vertical section taken substantially on the line 2—2 of Figure 3;

Figure 4 is a fragmentary exploded view, in perspective, of the gear shift lever and shifter rods.

Figure 3:
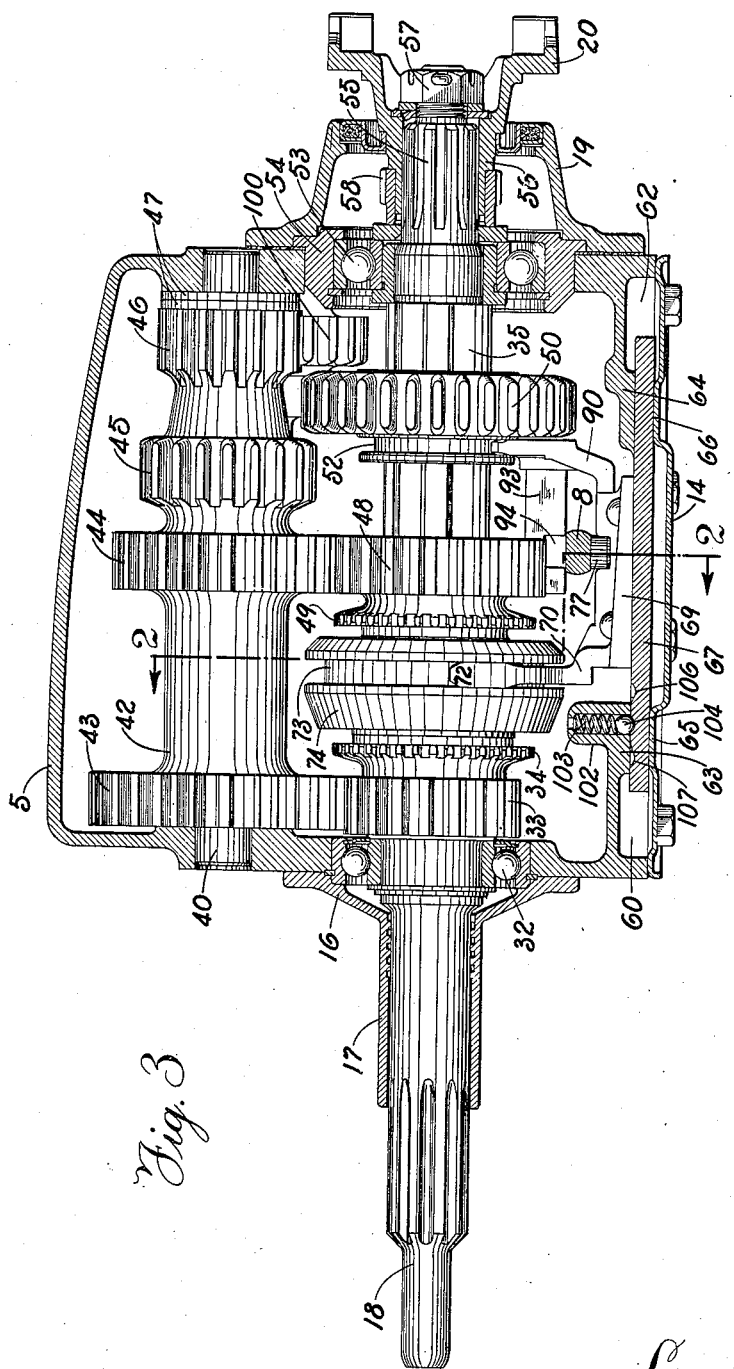
Figure 3 is a transverse sectional view taken substantially on the line 3—3 of Figure 1.

Referring now in detail to the drawings, I have disclosed in Figure 1 the general form of transmission embodying the present invention. The transmission consists of a relatively shallow housing 5 of considerable lateral extent which has the pedestal lever supporting portion 6 rising from the upper surface thereof at one side of the housing and located substantially midway between the ends of the housing. Mounted upon the pedestal 6 is a retaining cap 7 through which extends the gear shift lever 8 having the shifter knob 9 secured to the upper end thereof.

The housing 5 is provided with a filler opening normally closed by the plug 10 and is also provided with a boss 12 in which is secured a drain plug 13 that is removable for draining lubricant from within the housing 5. The housing is formed as an integral member, preferably a casting, and is open along one lateral wall thereof, this opening being closed by a side plate 14 secured to a defining flange on the lateral wall of the housing by means of studs 15.

The housing 5 is provided adjacent its forward end with a bearing cap member 16 suitably bolted thereto and having an extending sleeve portion 17 forming a guide for receiving the splined drive shaft 18 connected in any suitable manner to a clutch mechanism whereby it may be coupled to the motor or source of driving power.

The rear end of the housing 5 is provided with a bearing retaining cap member 19 which encloses the driven shaft extending rearwardly out of the housing and is provided at its end with the companion flange 20 adapted to be secured to a corresponding flange to provide a universal joint connection to a propeller shaft or similar torque transmitting member.

Considering now in detail Figures 2 to 4, inclusive, it will be noted that the pedestal support 6 for the gear shift lever is provided with a spherical seating portion 22 which is adapted to receive the spherical ball member 23 carried on the gear shift lever 8 and having the cross pin 24 extending transversely therethrough. The upper portion of the pedestal support 6 is provided with U-shaped slots 25 and 26 adapted to receive the projecting ends of the pin 22. It will be noted that the slot 26 has a greater depth than the slot 25 and that the pin 24 does not seat in the base of the slot 26 but is spaced slightly thereabove.

In order to maintain positive seating engagement between the ball portion 23 and the seat 22 there is provided a helical coil spring 27 encircling the lever 8 immediately above the ball portion 23 and biased at one end on the flat upper surface of the member 23 and at its opposite end against a concave disk 28 which has the same radius of curvature as the upper surface 29 of the cap member 7. The disk at 28 is apertured to seat closely about the lateral surface of the gear shift lever 8 and serves to seal the slot or opening 30 against leakage of the lubricant therethrough as the lever 8 is moved within the opening 30 into its various shifting positions.

The drive shaft 18 which extends into the forward end of the housing 5 is provided with a shouldered portion upon which is disposed the inner race of a ball bearing assembly indicated generally at 32. This race is prevented from movement in one direction by the hub portion of a gear 33 which may be formed integrally with the shaft 18 or suitably secured in non-rotative engagement therewith. The outer bearing race of the bearing assembly 32 is retained in fixed position by engagement in a suitably shouldered portion of the bearing cap 16 and the bearing assembly mounting of the shaft is thus effected in a substantially well known manner. The inner end of the shaft 18 is provided with external clutch teeth 34 and is also suitably recessed axially to receive the forward end of a driven shaft 35 which is piloted therein.

Spaced laterally of and extending parallel to the driven shaft 35 and journaled at opposite ends in the housing 5 is a countershaft 40 which is disposed in substantially the same horizontal plane as the shaft 35. Mounted for rotation on the shaft 40 is a compound gear member 42 having the gear portion 43 disposed adjacent the forward end of the transmission and having an intermediate gear portion 44, a low speed gear portion 45 and a reverse speed gear portion 46 disposed adjacent the rear end of the transmission housing. Suitable thrust washers 47 are provided for receiving the axial thrust of the gear member 42 against the shaft journals.

Mounted for free rotation upon the driven shaft 34 is an intermediate gear member 48 which is mounted in meshing engagement with the gear 44 of the counter shaft. The gear 48 is provided with a laterally extending upper portion terminating in external clutch teeth 49 disposed in spaced relation to the clutch teeth 34 of the gear 33.

Between the gear 48 of the outer end of the shaft 35 I provide a second gear member 50 having the shifter collar 52 formed integrally therewith and having internal splines adapted to mesh with the splined portion of the shaft 35 to provide longitudinal movement thereon. The outer end of the shaft 35 is supported by means of a suitable ball bearing assembly 53 locked in a bearing retaining member 54 which is journaled in the rear end of the transmission housing and located in fixed position by means of the extending flange member 19. The outer end of the shaft 35 is provided with a splined portion 55 of reduced diameter which is adapted to receive the hub portion 56 of the companion flange 20, secured thereon by means of the nut 57 threading over the outer end of the shaft. Suitably mounted upon the hub portion 56 is a flange member 57 having a small gear 58 adapted for driving suitable mechanism connected to a speedometer or the like and indicating the relative speed of rotation of the shaft 35.

The lateral side wall of the housing 5 is provided with recessed portions 60 and 62 adjacent the front and rear thereof, these portions terminating in bosses 63 and 64, respectively, which cooperate with suitably indented portions 65 and 66 of the closure plate 14 to form longitudinal guideways for the shifter rods 67 and 68.

The rod 67, as shown more clearly in Figure 4, has suitably secured thereto a shifter fork comprising a base portion 69 riveted or otherwise secured to the rods 67 and provided with an inwardly and normally extending yoke portion 70 terminating in substantially diametrically spaced bearing shoulders 72 adapted to engage in the shifter groove 73 of a synchronizing clutch member 74. Formed on the base portion 69 adjacent one side thereof is a thickened portion 75 which is provided with a transverse notch 76 adapted to receive the pin 77 riveted or otherwise secured in the opening 78 in the lower end of the shift lever 8. It will be apparent that upon forward or rearward movement of the upper end of the shift lever 8 with the pin 77 engaged in the notch 76 the shifter rod 67 will be moved rearwardly or forwardly, respectively, and will produce corresponding movement of the yoke 70 and consequently corresponding movement of the clutch member 74. This clutch member is mounted upon a hub or synchronizing mechanism 79 which has splined engagement upon the drives and the splined shaft 35.

Radial recesses are formed in the member 79 as indicated at 80, each of which is adapted to contain a coiled spring member 82 normally biasing the synchronizing ball members 83 radially outwardly of the member 79. The clutch 74 embraces the ball members and is longitudinally slidable upon the member 79 into engagement with the clutch teeth 34 of the gear 33, or the clutch teeth 49 of the gear 48. It will thus be apparent that the clutch 74 serves to clutch the shaft 18 directly to the shaft 35 when engaged with the clutch teeth 34, or serves to clutch the gear 48 to the shaft 35 when engaged with the clutch teeth 49. The selective clutching movement is imparted to the member 74 by forward and rearward movement of the gear shift lever 8 when in normal biased position with the pin 77 urged into the notch 76.

The shifter rod 68 is provided with a shifter fork or yoke 90 having the base portion 92 secured to the inner face of the rod 68 by means of rivets or the like. Extending parallel to the rod 68 and spaced laterally inwardly therefrom upon the yoke 90, is a short stud member 93 having a notch 94 contained therein which is adapted to receive the knob portion 95 formed at the lower extremity of the gear shift lever 8. The yoke 90 is adapted to have engagement in the collar portion 52 of the gear member 50 so that longitudinal shifting movement of the shifter rod 58 will result in corresponding movement of the gear 50 upon the splined portion of the shaft 35 into meshing engagement with either the gear 45 or with a reverse speed gear 100 mounted upon a second countershaft disposed beneath the shaft 40, the gear 100 being constantly in mesh with the gear 46 of the gear member 42.

It will be noted from the inspection of Figure 2 that the spring member 27 normally biases the gear shift lever 8 for clockwise rotation about the seat 22. This is due to the fact that the slot 26 is deeper than the slot 25 and consequently allows the lever 8 to pivot about the point of engagement of the pin 24 in the slot 25; however, the pin 77 engaged in the notch 76 limits this movement and maintains the gear shift lever 8 in a normal position shown in Figure 2. It will be apparent, however, that in order to disengage the pin 77 from the notch 76 it is necessary to rock the lever 8 laterally in a counterclockwise direction against the spring pressure to rotate the same about the portion of the pin 24 in the slot 25 thereby raising the portion of the pin 24 lying in the slot 26 and moving the lower end 95 of the lever into the notch 94 of the shifter stud 93 associated with the shifter fork 90. In order to maintain the gear shift lever in this position it is necessary to maintain lateral pressure thereon against the pressure of the spring 27.

Consequently, it will be obvious that the lever is normally biased into position for engagement with the shifter rod 67 and a conscious effort on the part of the operator is required to move the shift lever to a position where it engages the shifter rod 68. This prevents the operator from accidentally shifting from low speed into reverse speed since as the lever 8 passes neutral position the spring pressure will be effective to rock the same laterally away from the shifter rod 68 and into engagement with the shifter rod 67. Consequently, the operator will be conscious of this resistance and the possibilities of shifting from low into reverse without the conscious intention of the operator will be eliminated. This construction definitely locates the shift lever when in neutral position in engagement with the shifter rod 67 so that the operator at all times will know the particular relative position of the shift lever with reference to the shifter rods.

It will be noted that the boss portion 63 of the housing 5 is provided with a laterally inwardly extending portion 102 having axial recesses adapted to receive the spring 103 which normally urges the ball 104 into engagement in suitable detents 105, 106 and 107 formed in the inner surface of the shifter rod 67. A similar boss is provided below the boss 102 in such position that the ball corresponding to the ball 104 carried thereby is pressed into engagement in the detents 108, 109 and 110 formed in the inner surface of the shifter rod 68. Thus the shifter rod which is normally in neutral position with the spring pressed detent balls engaging in the notches 105 and 108 can be shifted longitudinally only when sufficient pressure is applied thereto to force the ball inwardly against pressure of the spring. When the rod is shifted to its predetermined position for engaging the selected gears the ball moves outwardly under the pressure of the spring into the detent corresponding to the shifted position of the rod, thus when the shifter rod 67 is operated to move the clutch 74 into engagement with the clutch teeth 49 of the gear 48 the ball 104 will move into the recess or notch 107 and thus hold the shifter rod 67 in its shifted position. Similarly, when the rod 67 is shifted to move the clutch 74 into engagement with the clutch teeth 34, the ball 104 is snapped into the notch or recess 106 to hold the shifter rod in this position until positive pressure is again applied to the gear shift lever.

The vertical position of the shifter rods 67 and 68 at one lateral wall of the transmission housing 5 results in the gear shift lever 8 having different degrees of swinging movement with reference to the shifter rods; thus it will be noted that the effective lever arm of the lever 8, when engaged in the notch 76 is considerably smaller than the effective arm when engaged in the notch 94. Consequently the amount of longitudinal movement imparted to the shifter rod 67 is considerably less than that imparted to the shifter rod 68. However, the transmission is so designed that only a slight forward or rearward movement of the shifter rod 67 is sufficient to produce the required shifting movement of the clutch 74 while a considerably greater longitudinal movement of the rod 68 is required in order to move the gear 50 from one of its shifted positions to the other.

In the operation of the transmission low speed drive is accomplished by rocking the lever 8 laterally against the pressure of the spring 27 to force the knob 95 thereon into engagement in the notch 94 and simultaneously disengage the pin 77 from the notch 76. The lever is then pulled rearwardly which moves the lower end thereof forwardly and consequently moves the shifter fork 99 forwardly to move the gear 50 into meshing engagement with the gear 45. This results in a low speed drive being effected from the shaft 18 through gears 33 and 43 and back to shaft 35 through the gears 45 and 50. When the operator desires to shift into second speed the gear shift lever 8 is moved forwardly and as it reaches neutral position the pressure of the spring 27 rocks it laterally to disengage the lower end 95 from the notch 94 and to engage the pin 77 in the notch 76 of the shifter rod 67. Further forward movement of the upper portion of the lever 8 results in rearward movement of the rod 67 and consequently rearward movement of the clutch 74. As a result, the clutch moves into synchronizing meshing engagement with the gear teeth 49 of the gear 48 and clutches the gear 48 directly to the shaft 35 whereby second speed drive is effected from the shaft 18 through the gears 33 and 43 and the gears 44 and 43 to the shaft 35 by way of the clutch 74. When the gear shift lever 8 is pulled rearwardly it passes neutral position and is still biased into engagement with the shifter rod 67 to move the shifter rod from its rearward position to its forward position thereby moving the clutch 74 out of engagement with the gear 48 and into engagement with the clutch teeth 34 of the gear 33. This couples the shaft 18 directly to the shaft 35 and direct high speed drive from the motor to the propeller shaft.

If the operator desires to shift to reverse the gear shift lever must first be brought to neutral position and by a conscious effort on the part of the operator it may then be rotated against the pressure of the spring 27 laterally to a position to engage the knob 95 in the notch 94. Forward movement of the upper end of the lever 8 when it is held against the spring pressure results in rearward movement of the shifter rod 68 which results in moving the gear 50 into meshing engagement with the gear 100. This results in imparting a reverse direction of rotation to the gear 50 and reverses the direction of the movement of the vehicle. However, when the gear shift lever 8 is brought to neutral position it is immediately biased out of engagement with the shifter rod 68 and into engagement with the shifter rod 67.

By reason of the present construction in which the shafts 35 and 40 are disposed in substantially the same horizontal plane, it will be noted that the vertical extent of the housing 5 is materially reduced; also, the vertical position of the shifter rods along one lateral edge of the housing eliminates the increased height necessary for this mechanism in the standard types of transmission. As a result a shallow transmission structure is provided which has minimum vertical height and consequently provides for adequate road clearance without protruding above the floor level in the forward portion of the vehicle, even with the attachment of automatic shifting mechanism. At the same time the shallow housing requires less lubricating oil to produce adequate lubrication than has been necessary with prior types of construction.

I am aware that various changes may be made in certain of the details of construction of the illustrated embodiment of the present invention and I therefore do not intend to limit the same except as defined by the scope and spirit of the appended claims.

I claim:

1. A transmission including a housing open at one side thereof, laterally spaced shafts in said housing in horizontal alinement with said side, vertically spaced shifter rods mounted for longitudinal sliding movement at said side, and a shift lever universally mounted on said housing above said rods and having longitudinally spaced means selectively engageable with said rods on the side adjacent to one of said shafts for actuating the same.

2. A transmission comprising a housing open at one side thereof, a drive shaft extending into one end of said housing, a coaxial driven shaft extending out of the opposite end thereof, a cover plate for the open side of said housing, a shifter rod mounted for longitudinal movement between said cover plate and said side of said housing, a clutch for coupling said shafts together, and a lever mounted above said drive shaft pivoted intermediate its ends on said housing and having its lower end between said shift rod and said drive shaft and normally biased into engagement with said rod for selectively actuating said clutch.

3. In a change speed transmission, a housing, a pair of parallel shafts extending longitudinally therein and disposed in substantially the same horizontal plane, gears on said shafts, said transmission being open at one side thereof, a side plate for said transmission, shifter rods disposed in spaced vertical position at said open side between said plate and housing and adapted to be shifted longitudinally for selectively coupling said gears in different speed ratios, and a gear shift lever mounted on top of said housing adjacent said side and having its lower end extending between said rods and the adjacent shaft, said lever being laterally rockable for selective engagement with said rods and longitudinally rockable for effecting shifting movement of the selected rod.

4. In a change speed transmission, a housing open at one side thereof, a plurality of shifter rods in spaced vertical position at said side and longitudinal shiftable for effecting selective speed ratios through said transmission, a pedestal support on said housing adjacent said side, a gear shift lever pivoted intermediate its ends on said support and having its lower end offset to extend alongside the inner sides of said rods, and means at said support normally biasing the lower end of said lever into engagement with one of said rods.

5. The transmission of claim 4 characterized in means spaced longitudinally along the lower end of said lever and operable to engage predetermined rods upon lateral rocking of said lever in said support.

6. The transmission of claim 4 characterized in means on one of said rods spaced laterally inwardly of said housing between which the lower end of said lever projects and having a notch therein for receiving the end of said lever when it is laterally rocked away from said rods.

7. In a transmission housing having change speed gearing therein, and having an open side, a cover plate for said side, vertically spaced shift rods mounted for longitudinal movement between said plate and side, and a gear shift lever universally mounted intermediate its ends on the top of said housing and extending down along the housing side of said rods, said lever having means spaced longitudinally thereon for selectively engaging said rods upon lateral rocking movement of said lever.

8. In a transmission housing having a pedestal support on the top thereof, a gear shift lever universally mounted on said support and having the lower end thereof offset to extend downwardly along one side of said housing, vertically superposed shift rods, means at said side of said housing supporting said rods for longitudinal shifting movement, one of said rods having a laterally inwardly spaced portion between which said lever projects, and means spaced longitudinally along the lower end of said lever for selectively engaging said portion of said one rod or the other rod upon lateral rocking of said lever.

9. In a transmission housing, a pair of vertically spaced longitudinally shiftable shift rods mounted in one side wall of said housing, a gear shift lever universally supported intermediate its ends on the top of said housing and having its lower portion offset to extend along the said side of said housing inwardly of said rods, each of said rods carrying a laterally inwardly directed shift fork, one of said rods having an inwardly opening notched lug, the other of said rods having a laterally inwardly offset lug portion with a notched portion opening toward the side of said housing, the lower end of said lever projecting between said other rod and its offset lug portion and laterally rockable into said notch, and means projecting laterally of the lever above said end for engaging in the notched lug of said one rod when laterally rocked out of the notch in said offset lug portion.

10. A transmission including a housing having a top and an open side, a gear shift lever universally supported in said top and having the lower portion extending within said housing in laterally offset position along said side, vertically spaced shift rods disposed on the defining face of said side for longitudinal shifting movement, a cover plate for said side supporting said rods in position, and means on the lower portion of said lever for selectively engaging said rods upon lateral rocking of said lever in its support.

LEO O. BURT.